United States Patent [19]

Lester

[11] 4,341,800
[45] * Jul. 27, 1982

[54] FOOD FOR FROGS

[76] Inventor: Dozier Lester, 156-F Guilbeau Rd., Duson, La. 70529

[*] Notice: The portion of the term of this patent subsequent to May 10, 1994, has been disclaimed.

[21] Appl. No.: 211,566

[22] Filed: Dec. 1, 1980

[51] Int. Cl.³ .................................................. A23K 1/10
[52] U.S. Cl. ........................................ 426/1; 426/132; 426/513; 426/805
[58] Field of Search ............... 426/641, 289, 1, 132, 426/454, 805, 513, 517, 657; 119/51 R, 1

[56] References Cited

U.S. PATENT DOCUMENTS

| | | | |
|---|---|---|---|
| 871,935 | 11/1907 | Henzel | 426/1 |
| 2,827,376 | 3/1958 | Breuer | 426/1 |
| 3,903,304 | 9/1975 | Groninger, Jr. et al. | 426/657 |
| 4,022,160 | 5/1977 | Lester | 119/51 R |

OTHER PUBLICATIONS

Furia, CRC Handbook of Food Additives, 2nd Ed., vol. I, CRC Press, Inc. 1977 (p. 726).

Primary Examiner—Raymond N. Jones
Assistant Examiner—George C. Yeung
Attorney, Agent, or Firm—John M. Harrison

[57] ABSTRACT

A food specifically for frogs which is formulated to induce the frogs to swallow, and is characterized by a nutriment pellet or particle of selected composition and size, with strands of hair mixed with the nutriment and projecting in random distribution from the surfaces of the pellet. The frog food developed for smaller frogs may be rolled out and pelletized or otherwise compacted to a desired size according to a process which is a part of this invention.

2 Claims, 6 Drawing Figures

FOOD FOR FROGS

BACKGROUND OF THE INVENTION

1. Field of the Invention

This invention relates to a food developed specifically for frogs, and more particularly, to nutriment pellets or particles composed of multiple ingredients which include multiple strands of hair mixed with the nutriment and projecting from the surface of the pellets in random spatial orientation. The food may be prepared by initially pelletizing or otherwise compacting selected ingredients in certain proportions, and is subsequently mechanically introduced to the frog in such a manner that the induced movement of the food triggers the feeding instinct in the frog, and the frog is induced to "capture" the food with its tongue. When the food is thus lodged in the frog's throat, the projecting hair strands, which simulate the legs or wings of insects or other natural food, stimulate nerve endings in the throat, an event which triggers the swallowing action, and the food is ingested. Apparatus for introducing such a food to frogs is disclosed in my U.S. Pat. Nos. 4,002,160 and 4,038,947. This invention is applicable to virtually all frogs, including the bull frog, pig frog, leopard frog, and pickeral frog, in nonexclusive particular.

The raising of frogs for market and consumption has received increasing interest in the United States and in foreign countries in recent years. Frogs have for many years been shipped to major cities in the United States for consumption in restaurants, and have also been used for educational purposes, drug testing and biomedical research, and such uses have created an estimated 80 million dollar annual business. The Mexican government is also experimenting with the introduction of frogs into large impoundments built to supply water for irrigation purposes. The program is designed to provide a readily accessible food supply to supplement the restricted diet of the Mexican peasant living in the rural agricultural areas of Mexico. France has long recognized that frog legs are a delicacy, and large quantities of frogs are bred in France, chiefly for market purposes.

Description of the Prior Art

Most of the frogs sold in the United States originate from the rice fields of India, Formosa, and Japan, and breeding of frogs in the United States has been chiefly undertaken for laboratory purposes using live food, with an accompanying danger of disease due to parasites and symbionts associated with such food. Frogs normally eat such food as insects, minnows, earthworms, crayfish and spiders, and are characteristically interested in living food. Accordingly, providing sufficient quantities of live food to sustain large numbers of frogs in commercial or laboratory breeding programs frequently proves to be not only troublesome and expensive, but often impractical. It has been found that not only do frogs require live food for consumption, but the live food must also be presented to them in a natural manner in order to induce them to eat. For example, frogs will not normally eat dead insects placed in their proximity, but will readily capture and eat live insects. Furthermore, a frog will readily strike a non-edible, moving object such as a small leaf or pebble, but after "capturing" the object, the frog will expel it, since the object does not stimulate the nerve endings in the frog's throat which induce swallowing. It has long been recognized by those skilled in the art that providing an artificial food which is susceptible of being properly presented to a frog in a life-like manner and is also palatable to the frog after being "captured", is a problem in raising frogs for commercial and laboratory use.

Of interest in developing a non-living food for frogs are the efforts made in developing artificial baits and food for fish and aquatic animals, primarily for the purpose of capturing the animals and fish. One of the greatest efforts in this direction has been development of the artificial lure such as the plastic lure which simulates the natural food of fish, which lure is disclosed in U.S. Pat. No. 2,718,033 to C. I. Burke. The plastic baits are shaped to imitate crabs, grubs, fully developed insects, and the like, and are fitted with hooks for catching fish which attempt to swallow the lure.

Older lure manufacturing techniques are typified by U.S. Pat. No. 871,935 to John Henzel, which discloses construction of a lure from edible food stuff such as flour, rice, potatoe and egg, which material is enclosed in fabric such as muslin or gauze, and is shaped to resemble a frog, minnow, insect or other natural bait. Other efforts, such as the disclosure in U.S. Pat. No. 2,874,048 to C. A. Waldov, have been directed to development of water-soluble fish baits. This patent discloses a dyed, gelatinous body which is shaped as a worm, minnow or other live bait, with a fabric binder to provide sufficient structural integrity. The gelatin slowly dissolves in the water and simulates bleeding, which is said to attract game fish. Odor-producing or flavoring substances can also be included in the gelatin as an added attraction.

A freeze-dried food for aquatic animals is disclosed in U.S. Pat. No. 3,361,566 to H. R. Axelrod, which food is formed of high protein materials such as meat, and water-activating adhesive substances. The food is said to provide a freeze-dried aquatic animal food which is capable of being immersed for long periods of time in water containing the animals, and the residue of which does not rapidly deteriorate. A similar food material is disclosed in U.S. Pat. No. 3,903,304 to H. S. Groninger, Jr., et al., which material acts as a protein binder for fish foods and fish bait compositions. The binder is said to have the texture of natural muscle tissue and is attrition-resistant. Other food compositions, and food compositions having a fibrous texture, are disclosed in U.S. Pat. No. 3,093,483 to N. H. Ishler. The food compositions were developed to simulate the texture, flavor and appearance of commercially available meat products.

While the baits, lures and food compositions disclosed in the above described patents have as a primary purpose the objective of enticing a fish or aquatic animal to feed on the bait or lure, the frog food of this invention is designed specifically to induce frogs to swallow, the life-life characteristics necessary to induce capture by the frogs being imparted to the food by mechanical means. Thus, no effort is made according to the disclosure of this invention to provide a food which simulates any natural frog food, such as insects and the like. The frog food of this invention is not, therefore, characterized as a bait or lure in the generally accepted sense of these terms.

Accordingly, it is an object of this invention to provide a non-living food for frogs which can be mechanically presented to frogs to simulate life, and when "captured" by the frogs, stimulates the frogs to swallow the food.

Another object of the invention is to provide frog food pellets or particles which can be made from commercially available animal and fish nutriment, which pellets or particles contain multiple strands of hair to effect a proper throat stimulation in the frog in order to induce swallowing of the food pellets.

Still another object of the invention is to provide a non-living frog food consisting of a pellet of nutriment having multiple strands of hair mixed with the nutriment and projecting from the surfaces of the pellet in random spatial orientation, which pellet can be presented to a frog in a variety of ways to encourage feeding, and when once "captured" by the frog, stimulates the frog to swallow and ingest the food.

Yet another object of the invention is to provide a food for frogs which is composed of a compacted, pelletized nutriment of selected composition having multiple streamers or strands of horsehair mixed with the nutriment and protruding from the surfaces or surface of the nutriment body in random directions to texture the food, stimulate nerves in the frog's throat, and induce it to swallow the food.

A still further object of the invention is to provide a method of manufacturing a non-living frog food by mixing a quantity of nutriment from selected ingredients, adding multiple strands of horsehair to the nutriment mixture, rolling the mixture into an elongated or flat mass and cutting or breaking the mass into discrete pellets or particles having the strands of horsehair projecting from substantially all surfaces of the pellets or particles in random spatial orientation.

SUMMARY OF THE INVENTION

The frog food of this invention includes a nutriment having certain selected ingredients and prepared so as to be palatable to frogs, which ingredient combination has some characteristics of natural food. The nutriment ingredients are mixed with strands of a digestible material such as hair, which protrude in random spatial orientation from the surface or surfaces of the nutriment mass in order to contact nerve endings in the frog's throat and induce swallowing. A procedure for mixing nutriment components in selected proportions with hair strands and rolling and pelletizing or caking the mixture to produce a frog food characterized by a nutriment mass with multiple strands of hair projecting from the surface or surfaces of the pellet or cake.

BRIEF DESCRIPTION OF THE DRAWING

The invention will be better understood by reference to the accompanying drawing, wherein.

DESCRIPTION OF THE PREFERRED EMBODIMENTS

Figure 1:
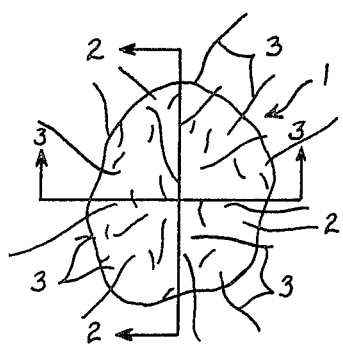
FIG. 1 is a perspective view of a pellet of the frog food of this invention.
Figure 2:
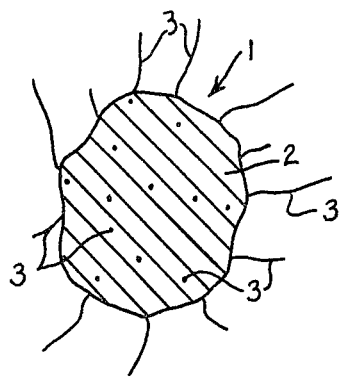
FIG. 2 is a vertical sectional view of the pellet, taken along lines 2—2 in FIG. 1.
Figure 3:
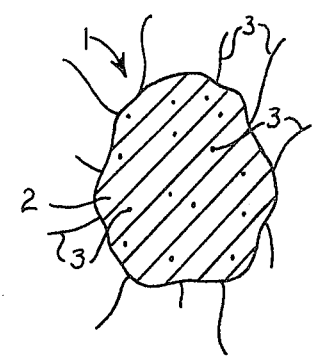
FIG. 3 is a horizontal sectional view of the pellet, taken along lines 3—3 in FIG. 1.

Referring now to FIGS. 1–3 of the drawing, a typical food pellet 1 of the large variety is illustrated, which pellet may be formed of random shape and of a size sufficient to be ingested by large frogs, as hereinafter described. Large food pellet 1 consists of a mass of nutriment 2, with multiple texturing strands 3, which are preferably individual fibers, such as hair and most preferably horsehair, which project from the surface of nutriment 2. It will be appreciated that strands 3 are mixed with the nutriment 2 in food pellet 1, and are therefore secured in random configuration, as illustrated in FIGS. 2 and 3. The specific spatial orientation of strands 3 in food pellet 1 is not critical, except that the strands 3 must project beyond the surface or surfaces of the nutriment 2. For purposes of illustration, multiple strands 3 are shown in the drawing, since it has been found that many randomly oriented strands are preferred for use in the frog food of this invention in order to provide sufficient contact with and stimulation of the nerves in the frog's throat to induce swallowing after food pellet 1 is "captured" by the frog.

Figure 4:
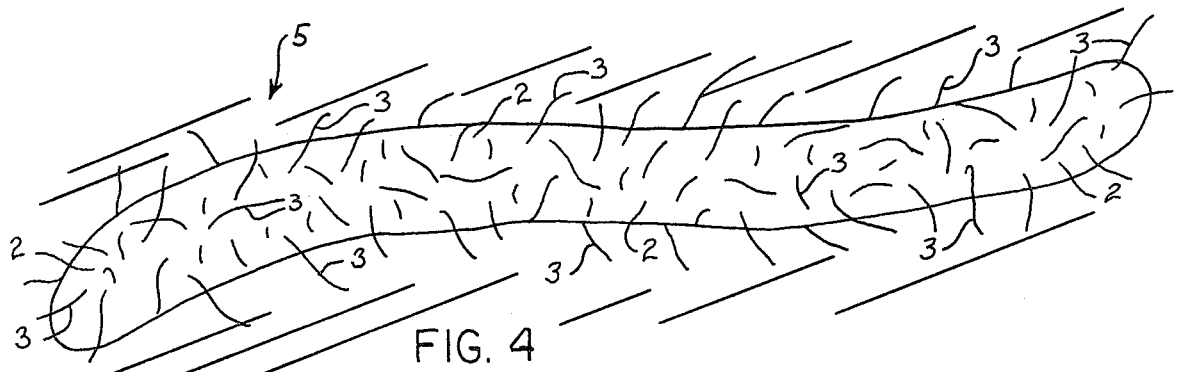
FIG. 4 is a perspective view of an elongated mass of nutriment shaped to produce smaller food pellets for smaller frogs.
Figure 5:
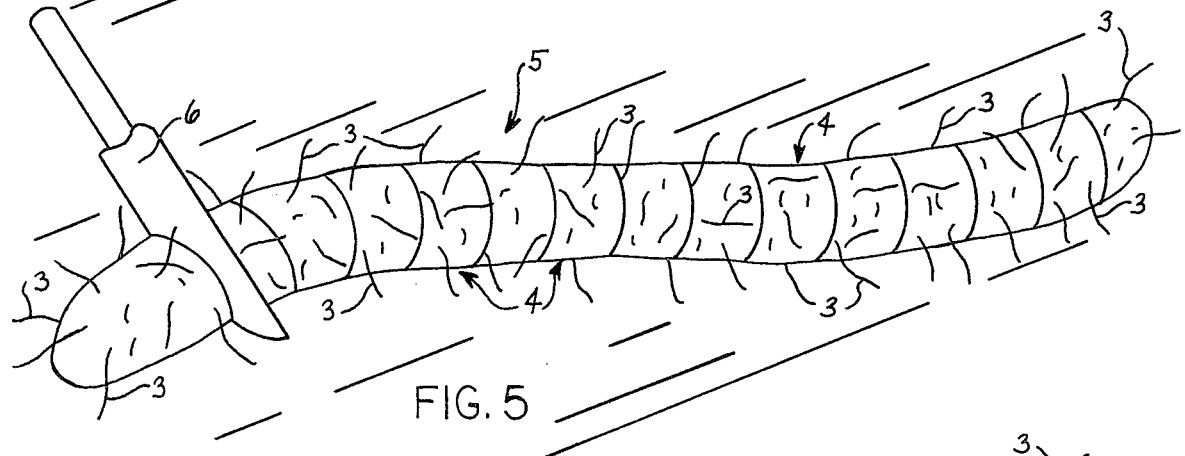
FIG. 5 is a perspective view of the elongated mass partially segmented by a knife.
Figure 6:
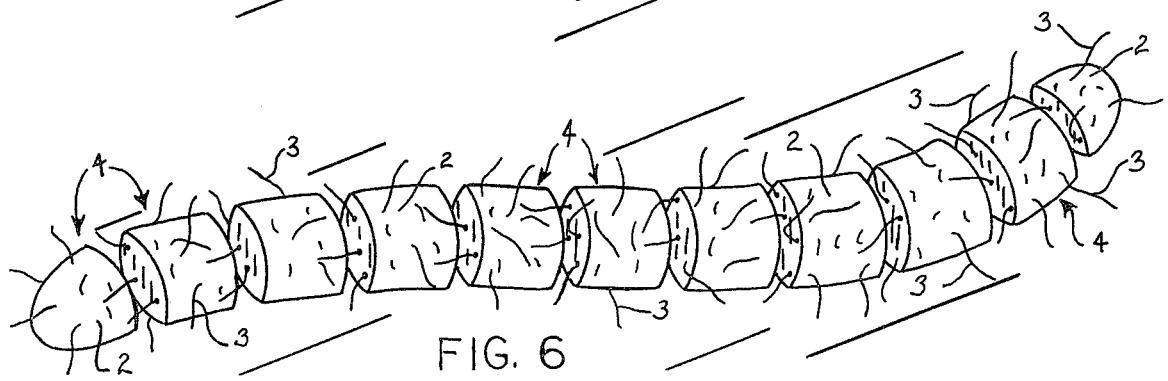
FIG. 6 is a perspective view of pellet segments cut or broken from the elongated mass of nutriment illustrated in FIGS. 4 and 5.

Referring now to FIGS. 4–6 of the drawing the small food pellets 4 (illustrated in FIG. 6) for smaller frogs are preferably shaped from an elongated mass 5 of nutriment having the same composition as nutriment 2 used to shape large food pellet 1. In a preferred embodiment of the invention a quantity of nutriment material containing selected ingredients in specified proportions, as hereinafter described, is rolled out on a flat surface to shape elongated mass 5. Elongated mass 5 is then served at spaced intervals by a dull knife 6, as illustrated in FIG. 5, to segregate small food pellets 4, as illustrated in FIG. 6. In a most preferred embodiment of the invention the small food pellets 4 are cut substantially through the thickness of elongated mass 5, but not through the strands 3, leaving a small uncut area and the unsevered strands 3, to allow removal of small food pellets 4 individually, as desired, and promote extension of the strands 3 from all surfaces of the segmented food pellets 4. Alternatively, the nutriment mass can be rolled out and flattened, and small particles broken off and feed to the frogs.

As heretofore discussed, the two primary problems realized in preparing an acceptable, non-living food for frogs is presentation of the food to the frog in a natural way to simulate life, and providing a palatable food texture which will activate the throat nerves and induce the frog to swallow after the food particle is "captured". The food described herein solves both of these problems with particular composition and texturing characteristics. The frog food of this invention is designed to be presented to frogs in a natural manner by mechanical means, and is preferably pelletized or otherwise compacted or caked to a desired size, with hair strands mixed in the compacted nutriment and projecting from the nutriment mass in all directions to induce swallowing. Typical ingredients which may be incorporated into the food individually or in combination, include seafood juices, such as fish, shrimp, oyster, crab, and crawfish juices; the juices of insects such as grasshoppers can also be used as ingredients of the food of this invention. A suitable nutriment made from a combination of ground crawfish hulls and fish meal may be combined with additional ingredients, as hereinafter described, to provide the base cake or pellet, as desired.

Most preferred ingredients for the frog food of this invention include fish meal and ground crawfish hulls, as well as "Kelgin F", which is a trademark of Kelco Company, a division of Merck & Company, Inc.; sodium hexametaphosphate; and "Kelflo", a trademark also owned by Merck & Company. "Kelgin" is a high viscosity sodium alginate derived from brown seaweed, or kelp, and the "F" designation refers to the degree of grind. When the selected ingredients have been mixed with water and horsehair strands have been added, the nutriment is pelletized, caked, or otherwise shaped to produce a food particle such as large food pellet 1 of desired composition and of sufficient size and consistency to be ingested by a frog of stipulated size. The food particle is now ready for presentation to a frog by mechanical means.

In a most preferred embodiment of the invention a nutriment having the following ingredients in the indicated proportions by weight is pelletized as hereinafter described, for mechanical feeding to frogs; fish meal—30.6%; ground crawfish (crawfish meal)—62.4%, Kelgin-F—3.0%; sodium hexametaphosphate—2.0%; and Kelflo—2.0%, to this mixture is added one pound of water for each pound of nutriment mixture, and horsehair strands for thorough mixing in the nutriment, the horsehair strands being added in the proportions of 0.64 ounces for each pound of nutriment for the large frog food, and 0.48 ounces for the small frog food.

It will be appreciated by those skilled in the art that the frog food ingredients described above can be shaped to an appropriate size which is proportional to the size of the frog being fed, with proper throat nerve stimulation provided in the form of multiple texturing strands 3 of appropriate length, as discussed above, to induce the frog to swallow. For example, and referring again to the drawing, small frogs have been found to readily capture and eat small food pellets 4, while the large frogs pay very little attention to the small food particles, and instead, turn their attention to the larger food such as large food pellets 1. Typically, frogs weighing from about 3 to about 80 grams seem to prefer the small food pellets 4, which are typically cylindrical in shape and measure approximately 3 millimeters in diameter and from about 3 to 6 millimeters in length. It has also been found that horsehair strands 3 measuring about 10 millimeters and mixed with the nutriment in food pellets 4 is appropriate and effective to stimulate the swallowing action in frogs of this size.

The next largest preferred pellet or particle size for the frog food of this invention is large food pellets 1 which have been shaped into rough spheres approximately 15 millimeters in diameter. Lengths of hair strands 3 about 15 to 30 millimeters in length are mixed with the nutriment 2 in large food pellets 1, and this food has been found appropriate to feed frogs weighing from about 50 to about 1000 grams. As heretofore noted, the hair strands 3 are mixed with the nutriment 2 in order to produce a random spatial orientation of hair strands, the ends of which project from the surface of the pellets in order to contact the inside surfaces of the frog's throat and stimulate swallowing.

It will be appreciated by those skilled in the art that the problem of presenting non-living food of proper size and texturing to captive frogs in a manner so as to induce feeding in the frogs can be approached from several directions. Of primary importance is the existence of movement of the food particle, which movement persuades the frog that the food is "alive". For example, it has been found that the frog food prepared according to the teachings of this invention can be presented to frogs by means of a release mechanism such as a soluble paper thread attached to the food and manipulated near the frog to cause the food particles to simulate natural food. Once the particle is "captured", the food is ingested, the paper thread dissolves and the objective of stimulating the frog to eat is accomplished. Alternatively, mechanical agitation of a liner in a feeding bowl and other techniques known to those skilled in the art can be used to effect the desired food particle movement to simulate the life-like characteristics of natural food.

The following examples illustrate a preferred process for producing the frog food of this invention.

EXAMPLE I

A quantity of large frog food pellets such as the large food pellets illustrated as reference numeral 1 in FIGS. 1-3 of the drawing were prepared by mixing one pound of water with one pound of nutriment composed of the following ingredients in the indicated proportions: fish meal—4.90 ounces; crawfish meal—10 ounces; Kelgin-F—0.48 ounces; sodium hexametaphosphate—0.32 ounces; and Kelflo—0.32 ounces. To this mixture was added 0.64 ounces of horsehair, and individual quantities of the nutriment about the size of a marble were removed with a fork, shaped generally in the form of a sphere, and allowed to air dry.

EXAMPLE II

A quantity of nutriment was prepared according to the procedure outlined in EXAMPLE I, and 0.48 ounces of horse hair was added. The mixture was mixed in a blender, removed from the blender after thorough mixing, and rolled on a flat surface to a diameter of about $\frac{1}{8}$ of an inch. The dull blade of a small knife was then dipped into a 25% calcium chloride solution and was used to partially sever individual particles of nutriment about $\frac{1}{4}$ of an inch wide, without severing the horsehair strands. The calcium chloride solution caused the Kelgin in the nutriment to harden and enable the individual particles to be cut and segregated more easily. The nutriment body was then allowed to dry, and individual pellets were broken from the nutriment mass along the segmented cuts and fed to the frogs as needed.

As heretofore noted, the Kelgin F ingredient of the frog food is a high viscosity sodium alginate. When the calcium in the calcium chloride solution present on the knife blade contacts the alginate, it promotes syneresis, and a gel forms at the point of contact; this gel aids in rapid hardening of the nutriment mass at the slots cut in the mass by the knife blade. The Kelflo ingredient is characterized by xanthan gum and ground limestone, and acts as a binder or gelling agent in the nutriment mass, while the sodium hexametaphosphate is a sequestrant which helps control the firmness and the setting time of the Kelflo. Additional calcium for reaction with the Kelgin-F to form gel is present in the limestone ingredient of the Kelflo. These ingredients help control the firmness and texture of the nutriment mass, and can be varied proportionally in the mass to achieve a nutriment body of selected consistency.

The crawfish meal is prepared by parboiling crawfish with no seasoning and the crawfish are then peeled to remove the meat in the tails. The heads, fat, legs and pinchers are then air dried, and after drying, the material is ground to the size and texture of meal.

Having described my invention with the particularity set forth above, what is claimed is:

1. A food for ingestion by frogs, said food prepared by mixing fish meal, ground crawfish hulls, sodium alginate, xanthan gum and ground limestone, and sodium hexametaphosphate in selective proportions with an equal quantity of water by weight to form a nutriment; adding horsehair to said nutriment; rolling said nutriment on a flat surface to shape an elongated mass; cutting slots in said elongated mass in spaced relationship without severing said horsehair; and allowing said nutriment to dry, whereby said horsehair projects from said elongated mass, and from discrete particles broken from said elongated mass along said slots, and said horsehair stimulates the frogs to swallow when said discrete particles are ingested by the frogs.

2. The food of claim 1 further comprising using a knife having a dull blade to cut said slots in said mass, and dipping said blade in a solution of calcium chloride before cutting said slots to contact said calcium chloride with said sodium alginate in said nutriment and congeal the edges of said nutriment adjacent said slots.

* * * * *